United States Patent [19]

Hall et al.

[11] Patent Number: 5,557,089
[45] Date of Patent: Sep. 17, 1996

[54] CARD READER SYSTEM AND METHOD OF OPERATION

[75] Inventors: Larry D. Hall, Richardson; Todd J. Betz, The Colony, both of Tex.

[73] Assignee: Intellicall, Inc., Carrollton, Tex.

[21] Appl. No.: 398,579

[22] Filed: Mar. 3, 1995

[51] Int. Cl.$^6$ .................................................. G06K 7/06
[52] U.S. Cl. .......................... 235/440; 235/441; 235/482
[58] Field of Search ........................... 235/440, 441, 235/475, 482

[56]  References Cited

U.S. PATENT DOCUMENTS 3,766,687  10/1973  Henson .................................. 235/482
3,953,712  4/1976  Horvath ................................. 235/482

FOREIGN PATENT DOCUMENTS 338900   10/1989  European Pat. Off. ............... 235/441
357827   3/1990   European Pat. Off. ............... 235/440
2658338  8/1991   France ................................. 235/380

Primary Examiner—John Shepperd
Attorney, Agent, or Firm—Baker & Botts, L.L.P.

[57] ABSTRACT

A card reader (10) is provided that comprises a forward gate (58) that prevents access to the interior of the card reader (10) by other than standard credit card-sized items. Side retainers (36), (38) and (40) coupled to retaining arms (28) and (30) serve to retain appropriately-sized cards and to eject cards which are not long enough. Rear retainers (54) and (56) serve to maintain appropriately-sized cards in contact with an electrical contact (74) of an electrical contact board (72). A fraud prevention antenna (86) prevents access to the electrical systems within card reader (10) from systems outside of card reader (10). A magnetic stripe reader (22) is included in a card guide (16) to allow card reader (10) to also use magnetic stripe cards.

18 Claims, 4 Drawing Sheets

CARD READER SYSTEM AND METHOD OF OPERATION

TECHNICAL FIELD OF THE INVENTION

This invention relates in general to the field of electro-mechanical systems used in vending machines and other systems and more particularly to an improved card reader system and method of operation.

BACKGROUND OF THE INVENTION

The construction of modern vending machines has included the use of card readers to provide convenience for customers and, in some part, to reduce or eliminate the fraud associated with cash transactions. Credit cards and debit cards used in vending machine operations come in two major varieties. The first is a magnetic stripe card that encodes information on a strip of magnetic material fixed to a side of the card. The magnetic stripe card is read by a magnetic head in the card reader. The second type of card is a chip card which includes a semiconductor chip embedded in the card itself. Electric contact points are provided on the surface of the card to allow information to be read from or written into the memory systems within the semiconductor chip within the card.

As with any system intended for use by the public, card readers have become victims of vandalism and misuse. Card readers on vending machines can be jammed by cards which are of incorrect shape or thickness. In addition, vandals or thieves can damage the internal workings of card readers by inserting knives or coat hangers or other probes into the card readers. Prior card reader systems have proved to be very susceptible to vandalism and misuse and, as such, have not been as reliable as necessary for public vending machine operations.

For public instruments such as pay telephones, service calls to repair a vandalized system are a significant portion of the costs of operating the pay telephone. As such, a need has arisen for a card reader system which prevents vandalism or misuse of the card reader from affecting future operation of the card reader and the system to which it allows access.

SUMMARY OF THE INVENTION

In accordance with the teachings of the present invention, a card reader system is provided that substantially eliminates or reduces disadvantages associated with prior systems.

According to one embodiment of the present invention, a card reader system is provided that comprises a spring-loaded forward gate that comprises opposing forward gate skids affixed to either edge of the forward gate. The forward gate prevents objects which are not the specific predetermined width of an appropriately-sized card from entering the card reader. The forward gate rides in closely-adjacent slots which prevent the ends of the gate from moving independently. As such, the forward gate prevents entry into the internal workings of the card reader by anything other than a card of specific width.

According to another embodiment of the present invention, a card reader system is provided that comprises retainer arms which act to measure the length of a card inserted into the card reader system. The retainer arms include forward-bearing extensions which insure that a card inserted into the card reader system is the appropriate length of a standard card. If the item inserted into the card reader system is not of the appropriate size and shape, the forward-bearing extensions will not remain in contact with the card and side retainers affixed to the retainer arms will be retracted. Once the side retainers are retracted, pressure exerted on the card by the forward gate will cause the improperly-sized card or other item to be ejected from the card reader system.

According to another embodiment of the present invention, a card reader is provided that insures that the card inserted into the card reader is of a standard rigidity. The card reader system comprises a spring-loaded forward gate that is offset from a portion of a forward-mounting plate. An edge of the forward gate and an edge of the forward-mounting plate define an opening through which the card is inserted into the card reader system. The offset in the two edges of the opening create a downward-bending force on the card being inserted into the card reader system. If the card is a standard card, the card will withstand the downward-bending force and will strike side retainers in the interior of the card reading system. However, if the card is not of sufficient rigidity because the card is not a standard card, the downward-bending force will cause the card to miss the side retainers and the card will be ejected from the card reading system.

According to another embodiment of the present invention, a credit card reading system is provided that includes a rear carriage system that provides rigid support for the card during the creation of electrical contact with contact points on a chip card. In addition, the system provides that as the card is inserted into the card reader system, the electrical contact points of an electrical contact board are moved laterally with respect to the electrical contact points on the card to cause the contacts to swipe through any corrosion or dirt on the credit card in order to make better contact between the card and the card reader.

According to another embodiment of the present invention, a card reader system is provided that comprises a magnetic stripe reader disposed at the entrance to the card reader system. The magnetic stripe reader reads information from a strip of magnetic material fixed to one side of the card. According to this embodiment, the card reader system is able to read magnetic cards as well as detect the existence of nonstandard cards and read chip cards. As such, the card reader system is extremely resistant to vandalism, misuse and theft, and is able to read both magnetic cards and chip cards.

BRIEF DESCRIPTION OF THE DRAWINGS

A more complete understanding of the teachings of the present invention may be acquired by referring to the accompanying FIGUREs in which like reference numbers indicate like features and wherein.

DETAILED DESCRIPTION OF THE INVENTION

Figure 1:
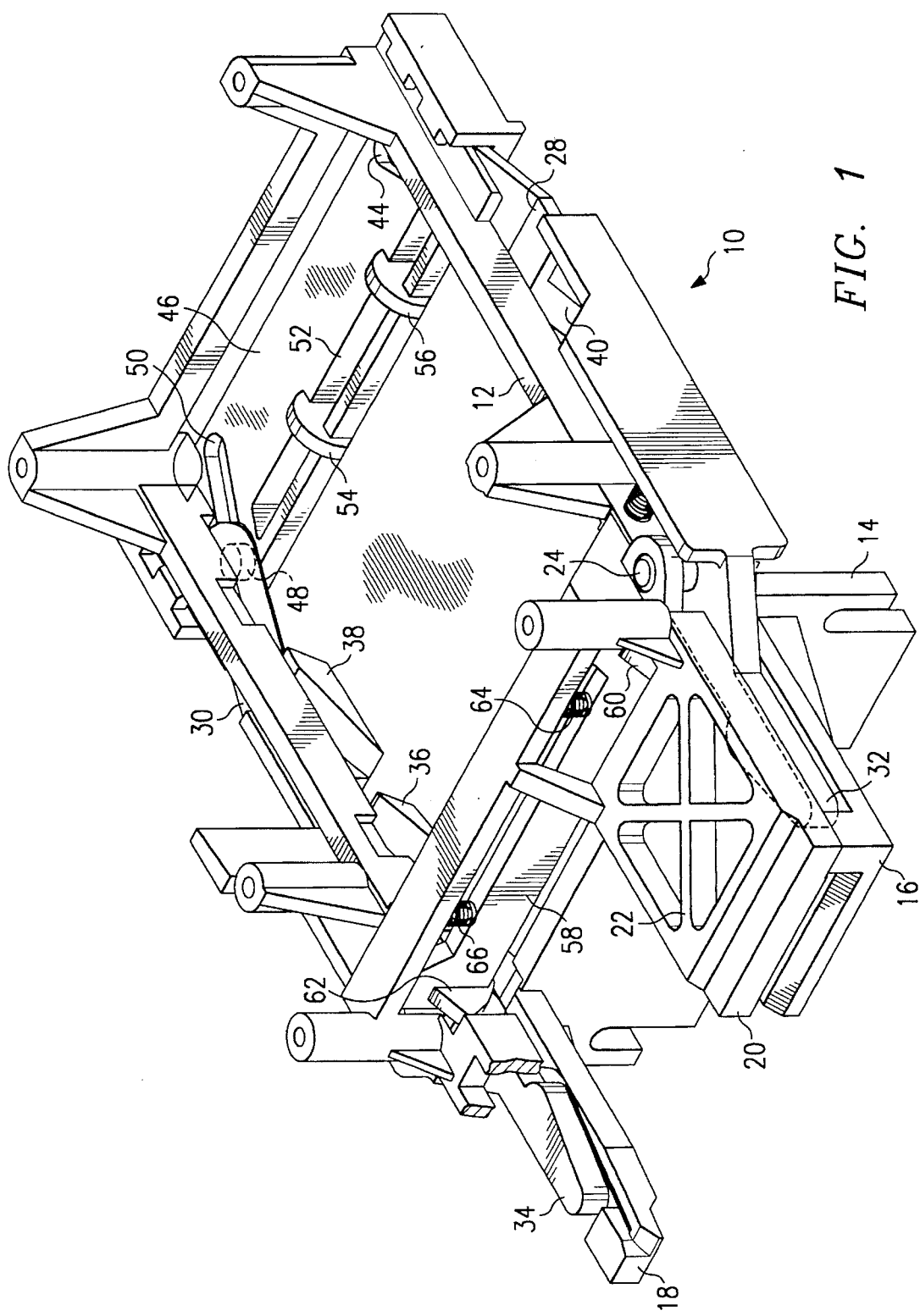
FIG. 1 is an isometric view of a card reader system constructed according to the teachings of the present invention.

FIG. 1 is an isometric drawing of a card reader assembly 10 which comprises a frame 12. Frame 12 includes a forward-mounting plate 14 for attaching the card reader 10 to a vending machine housing such as a pay telephone housing. The frame 12 also includes a right card guide 16 and a left card guide 18 which extend out from a pay telephone housing, for example, where the front plate of the housing will be disposed adjacent forward-mounting plate 14. The right and left card guides serve to accept the opposite edges of a card to be inserted into the card reader 10.

For purposes of clarity, card reader system 10 will be discussed in a particular orientation with the forward end of card reader 10 being the end toward forward-mounting plate 14. Right and left sides of card reader 10 are oriented-as if the viewer were looking at the forward end of card reader 10. As such, a card to be read by card reader 10 will be inserted by a user at the forward end of card reader 10 and will travel along a card path toward the rear end of card reader 10. Although the card reader 10 will be described in this orientation, it should be understood that this is solely a convenience for purposes of teaching the invention and that the card reader of the present invention may operate in a wide variety of orientations and configurations without departing from the teachings of the present invention.

Right card guide 16 is attached to a magnetic reader housing 20 which holds a magnetic stripe reader 22. Magnetic stripe reader 22 contacts a strip of magnetic material fixed to one side of a card inserted into card reader 10 if such a strip is present. Card reader 10 thus has the capability to read both magnetic stripe cards and chip cards as well as the ability to reject non-standard cards and other foreign objects.

On either side of the forward-mounting plate 14 are positioned axes 24 and 26. A right side retainer arm 28 rotates about axis 24 in a plane substantially parallel to the plane of a card inserted into card reader 10. Similarly, a left side retainer arm 30 rotates about axis 26 in the plane. Side retainer arm 28 includes right forward-bearing extension 32. Similarly, side retainer arm 30 includes left forward-bearing extension 34. Forward-bearing extensions 32 and 34 extend forward from axes 24 and 26. Forward-bearing extensions 32 and 34 are biased into a position in the path of a card being inserted into card guides 16 and 18. As such, as a card is inserted into card guides 16 and 18, the card will strike the forward-bearing extensions 32 and 34, causing them to move away from one another in the plane defined by the card being inserted. The forward-bearing extension's movement will cause the side retainer arms 28 and 30 to rotate about axes 24 and 26, causing the rear portions of side retainer arms 28 and 30 to move inwardly toward one another.

Side retainer arm 30 includes rear retainer 36 and rear retainer 38 formed integral therewith. Similarly, side retainer arm 28 includes rear retainer 40 formed integral therewith. Retainers 36, 38 and 40 operate to force an appropriately-sized card upward as long as they are maintained in the correct position by the forward portion of the card bearing on forward-bearing extension 32 and 34 discussed previously. The rear portion of side retainer 28 includes a peg 42 which engages a slot 44 within a rear carriage 46. Similarly, side retainer 30 includes a peg 48 which engages a slot 50 formed in rear carriage 46. Rear carriage 46 includes an extension 52 which holds a left rear retainer 54 and a right rear retainer 56. Extension 52 extends downwardly from the remainder of rear carriage 46 so that rear retainers 54 and 56 bear against the underside of an appropriately-sized card inserted into card reader 10. Rear carriage 46 is forced forward by the movements of pegs 48 and 42 within slots 50 and 44, respectively. Slots 50 and 44 are angled to cause this forward movement when side retainer arms 28 and 30 move toward one another when a card bears on forward-bearing extensions 32 and 34.

Forward-mounting plate 14 includes slots in its upward portion that hold a forward gate 58. Forward gate 58 includes a right gate skid 60 and a left gate skid 62. Forward gate 58 is biased in a downward position by a right gate spring 64 and a left gate spring 66. Forward gate 58 is closely held in the slots formed in forward-mounting plate 14 so that forward gate 58 must move as a unit directly upward and downward and cannot rotate or twist to any substantial degree. The placement of gate skids 60 and 62 are such that a card inserted in card reader 10 must engage gate skids 60 and 62 simultaneously in order to force open forward gate 58. The placement of gate skids 60 and 62 at the extreme opposite ends of forward gate 58 serves to measure the width of the card inserted into card reader 10. If a card or any other object, for that matter, is not wide enough to simultaneously engage gate skids 60 and 62, forward gate 58 will not open.

Figure 2A:
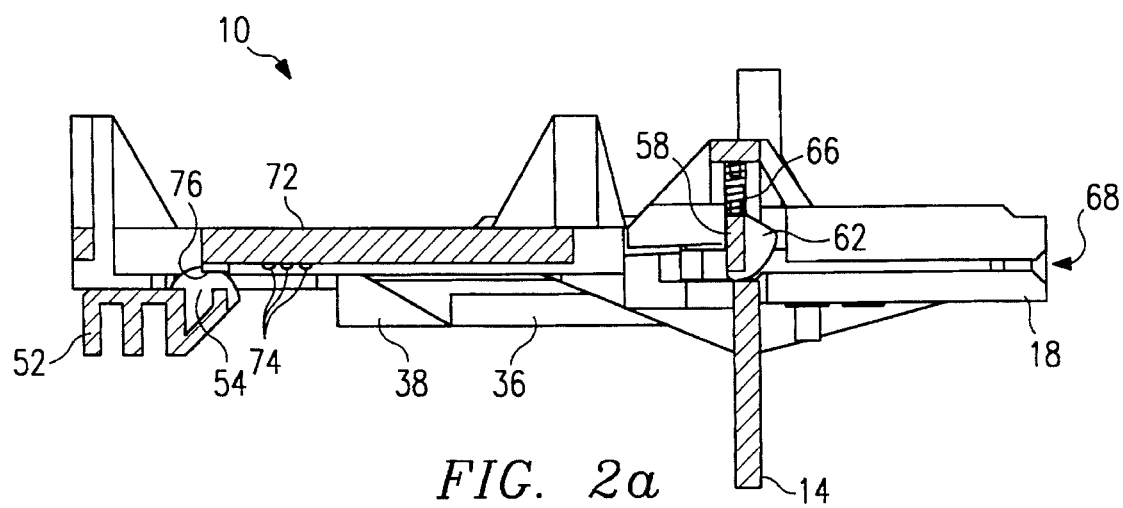
FIGS. 2a and 2b are cross-sectional side views of a card reader system constructed according to the teachings of the present invention.

FIG. 2a is a partially cut-away side view of card reader 10 which illustrates from a different perspective the interaction of certain of the parts described with reference to FIG. 1. Referring to FIG. 2a, the left card guide 18 is shown to define an opening indicated generally at 68 which is the entrance point of a card inserted into card reader 10. The card will pass unhindered through the pathway defined on the left by left card guide 18 until it strikes the forward gate skid 62 extending forward from forward gate 58. As discussed previously, gate 58 is biased in a downward position by gate springs 64 and 66 of which gate spring 66 can be seen in FIG. 2a.

Figure 2B:
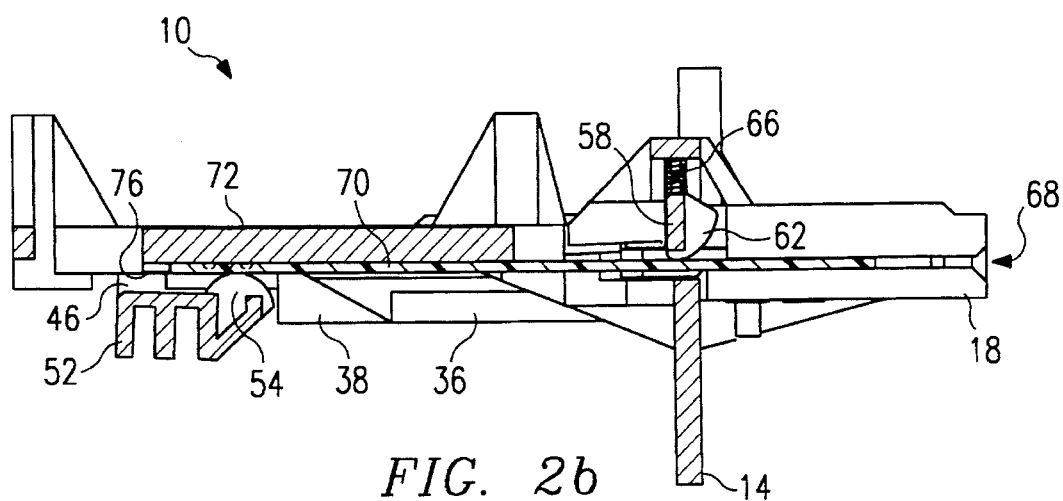

FIG. 2b illustrates the same view of the card reader 10 as in FIG. 2a with a card 70 fully inserted into the card reader 10. As can be seen in FIG. 2b, card 70 has struck the forward gate skid 62 and caused forward gate 58 to move upward so that card 70 is held between the forward gate 58 and an upper edge of the lower portion of forward-mounting plate 14. The card is also held upward by side retainer 36 and side retainer 38 seen in FIG. 2b. In addition, the rear portion of the card has struck rear retainer 54 and 56 of which rear retainer 54 can be shown in FIG. 2b. As discussed previously, rear retainer 54 is coupled to rear carriage extension 52 which is connected to rear carriage 46 which slides forward to cause rear retainer 54 and rear retainer 56 to come in contact with card 70. FIGS. 2a and 2b also illustrate an electrical contact board 72 which was omitted for purposes of clarity from FIG. 1. Electrical contact board 72 resides above the path of card 70 and includes electrical contacts 74 which come into electrical contact with the contact points on the card 70 when the card is fully inserted into card reader 10. Electrical contact board 72 includes a rear lip 76 which is engaged by the rear edge of card 70 immediately prior to the card being fully inserted. The electrical contact board 72 slides laterally along the card path when the rear lip 76 is engaged by the card 70. In addition to sliding laterally, the electrical contact board also moves slightly downward as it engages the electrical contact points on the card 70. This simultaneous rearward and downward movement causes the electrical contacts 74 to swipe laterally into the electrical contact points on card 70. This swiping action increases the probability that good electrical contact will be made between contact 74 and the electrical contacts on card 70 due to the fact that the electrical contacts 74 will swipe through any contamination, dirt, oil, etc. that might have accumulated on the contact points of card 70.

As shown in FIG. 2b, an appropriately-sized card is held in place during reading of the information from the card by electrical contact board 72 by rear retainers 54 and 56, side retainers 36, 38 and 40, and at the forward end of the car by the combination of the lower portion of forward-mounting plate 14 and forward gate 58 with forward gate skids 60 and 62.

Figure 3:
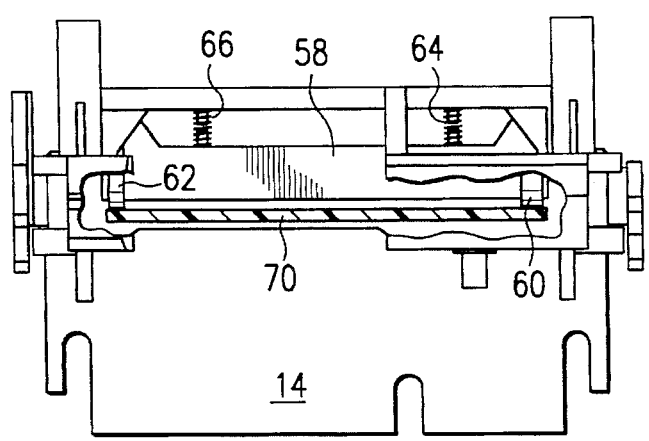
FIG. 3 is a partially cut-away front view of the card reader system of the present invention.

FIG. 3 is a front view that also illustrates the action of forward gate 58 when the card 70 is inserted. As shown in FIG. 3, card 70 is sufficiently wide to engage both forward gate skid 62 and forward gate skid 60 simultaneously. As such, forward gate 58 is forced upward allowing card 70 to pass into the interior of card reader 10. Portions of right card guide 16 and left card guide 18 are cut away in FIG. 3 to better illustrate the placement of card 70.

Figure 4:
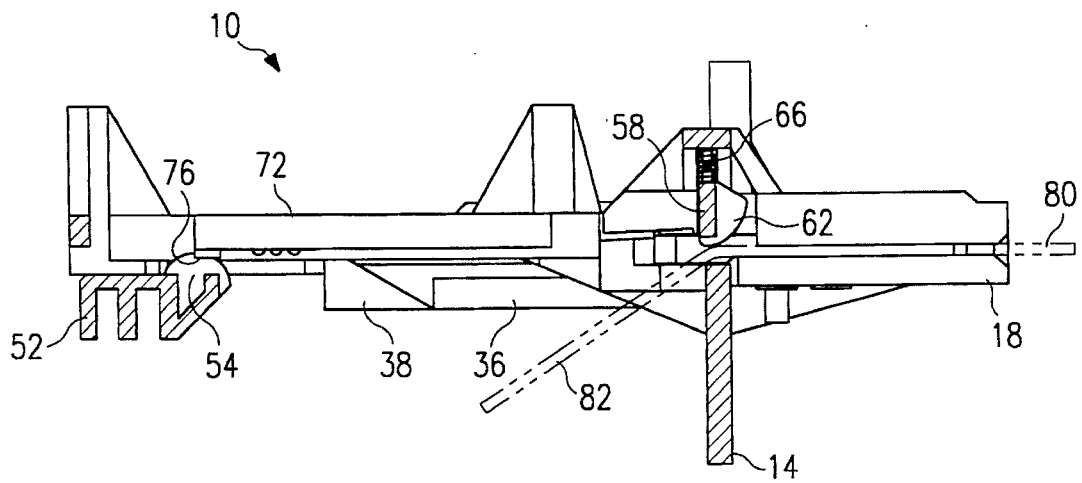
FIG. 4 is a cross-sectional side view of the operation of the card reader system of the present invention in expelling insufficiently rigid cards.

FIG. 4 illustrates the operation of system 10 when a card 80 having insufficient rigidity is inserted into system 10. As shown in FIG. 4, the point where the forward gate 58 and particularly the forward gate skids 60 and 62 contact card 80 is slightly offset with respect to the point at which the lower portion of mounting plate 14 contacts card 80. This rearward offset of the forward gate 58 causes a downward pressure on card 80. If card 80 is insufficiently rigid to withstand this downward pressure, a leading edge of card 80 indicated at 82 will miss the forward edges of retainer 36 and 38 and will thus be directed downwardly and out of card reader 10. Only a card with sufficient rigidity to withstand the downward force placed on the card by forward gate 58 and gate springs 66 and 64 will be able to extend and strike side retainer 36 shown in FIG. 4.

Figure 5B:
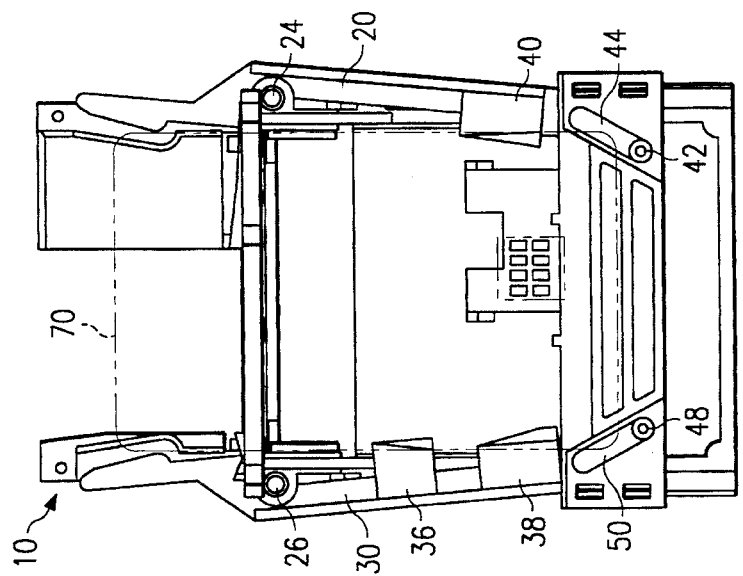
FIGS. 5a and 5b are bottom view illustrating the structure and operation of the card reader system of the present invention.
Figure 5A:
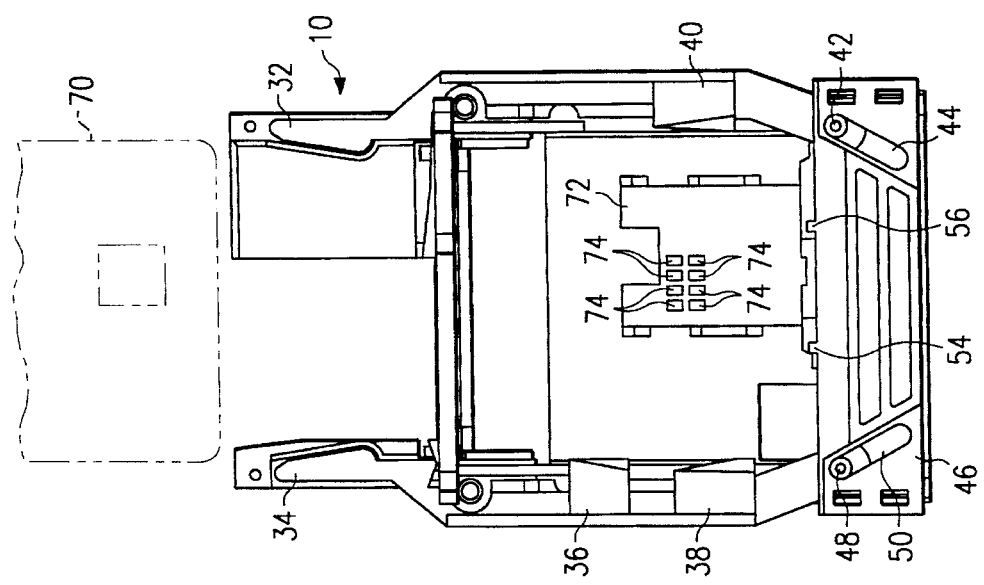

FIGS. 5a and 5b are bottom views of the card reader 10 as it is used to receive and hold a card 70 that is of the correct shape and rigidity. Referring to FIG. 5a, the forward-bearing extensions 32 and 34 are biased into the intended path of card 70. In this position, side retainers 36, 38 and 40 are maintained outside of the card path. Similarly, rear carriage 46 is maintained behind the intended resting spot of the card 70.

Referring to FIG. 5b, the card 70 is shown fully inserted into card reader 10. The forward-bearing extension 32 and 34 are bearing against the edges of the forward portion of card 70. This causes the retaining arms 28 and 30 to rotate about axis 24 and 26, respectively. This rotation causes the side retainers 36, 38 and 40 to rotate into the path of the card and to engage the card to hold it upward against the electrical contact board 72 and specifically electrical contact 74. The rotations of side retainer arms 28 and 30 also causes the pins 42 and 44 to engage the edges of slots 44 and 50, respectively. This action causes rear carriage 46 to move forward causing rear retainers 54 and 56 to engage the forward edge of card 70 further securing the card and forcing it into contact with electrical contact 74. FIG. 5b also shows that electrical contact board 72 moves rearward as card 70 engages lip 76 discussed previously.

Card reader 10 only allows a card having a specific width that is able to simultaneously engage forward gate skids 60 and 62 to enter the interior of card reader 10. The action of forward gate 58 and forward gate skids 60 and 62 prevent cards that are not wide enough and other foreign objects from entering the interior of card reader 10.

The actions of side retainer arms 28 and 30 prevent cards that are not the appropriate length from affecting the interior workings of card reader 10. A card that is not of the appropriate length will not continue to engage forward-bearing extensions 32 and 34. When extensions 32 and 34 are not engaged, the side retainer arms 28 and 30 will rotate causing retainers 36, 38 and 40 to come out of contact with the card. This action combined with the downward force placed on the card by forward gate 58 will cause the card to be ejected in a downward direction from card reader 10. This action results in cards that are too short or are of irregular shape and, as a result of their size or shape, do not continue to maintain contact with forward-bearing extensions 32 or 34.

Card reader 10 also rejects and ejects cards which do not have sufficient rigidity to withstand the downward force placed on the card by forward gate 58. This downward force results in the ejection of nonstandard cards that are made out of paper or plastic that are insufficiently rigid. A card that is sufficiently rigid that is intended for appropriate use in card reader 10 will withstand the downward force of gate 58 and will engage side retainer 36 first and then side retainers 38 and 40 and rear retainers 54 and 56 to be read by electrical contact board 72.

Card reader 10 helps to ensure good electrical contact between electrical contact board 72 and the electrical contacts on the card 70 by providing rigid support for card 70 during the reading operation. This rigid support is provided by the combined action of the side retainers 36, 38 and 40 and the rear retainers 54 and 56. In addition, the electrical contacts 74 are brought into contact with the card 70 in a lateral swiping motion due to the movement of electrical contact board 72 resulting from the insertion of card 70. This lateral swiping motion serves to cut through debris or contamination that may have formed on the surface of the card 70 and contributes to better electrical contact with card 70.

Card reader 10 allows for the use of both magnetic stripe cards and chip cards using a single credit card reader by including both the mechanisms described with reference to the electrical contact board 72 and a magnetic stripe reader 22 which is positioned in right card guide 16.

Figure 6:
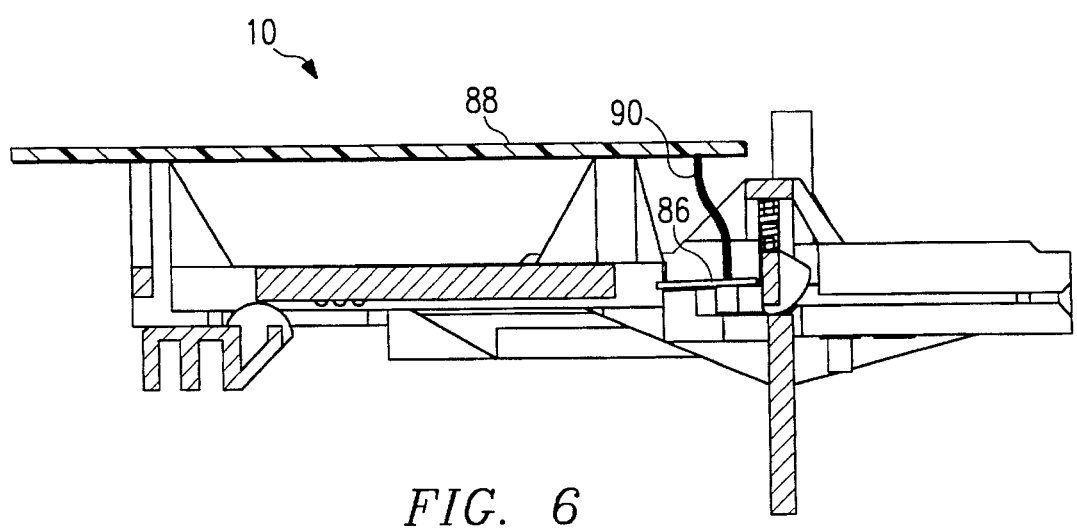
FIG. 6 is a side view of the placement of a fraud prevention antenna in the card reader of the present invention.

Referring to FIG. 6, a side view of card reader 10 is shown which includes a fraud prevention antenna 86 which is placed near the path of cards inserted in card reader 10. Antenna 86 is coupled to an antenna control board 88 through an antenna link 90. One method of defrauding card readers used with chip cards is to attach electrical conductors to the electrical contact points on the chip within the card. These conductors then extend outward from the card reader after the card attached to the conductors is inserted into the card reader. These conductors then provide direct access through the electrical contact point 74 to the electronics within the card reader 10. This direct access can be used by thieves or vandals to defraud or damage the card reader 10 or the accounting systems associated therewith. The antenna 86 operates to sense current passing through any conductors extending from the card outside of the card reader. The systems on board antenna controller 88 function to detect and analyze any signals detected by antenna 86. If any such signals are detected, card reader 10 is disabled to prevent access to electronics of the card reader and the accounting systems connected to the card reader 10. Accordingly, the card reader 10 provides for the protection of sophisticated defrauding techniques which involves electronic manipulation of the circuitry within the card reader 10 from using systems connected fraudulently to the electrical contacts of card reader 10.

Although the present invention has been described in detail, it should be understood that various changes, substitutions, alterations and modifications may be made to the teachings described herein without departing from the spirit and scope of the invention which is solely defined by the appended claims.

What is claimed is:

1. A card reader system for use to receive cards as a method of payment, the card reader system comprising:

a frame including a front mounting plate and defining a card path and a card entry point;

a forward gate disposed in the card path and operable to slide out of the card path;

a spring coupled to the frame and to the forward gate and operable to bias the forward gate in a position blocking the card path;

first and second gate skids disposed at opposite ends of the forward gate at the edges of the card path, the first and second gate skids operable to impact an appropriately sized card simultaneously such that only a card that is sized to impact both the first and second gate skids simultaneously can proceed along the card path past the opened forward gate; and an electric contact board disposed adjacent the card path behind the forward gate, the electric contact board operable to electrically couple to electric contact points on a card having such contact points.

2. The card reader system of claim 1 wherein the frame comprises slots formed proximate opposite edges of the forward gate and wherein the forward gate is disposed in the slots such that the forward gate is allowed to move laterally in the slots when opened but is prevented from substantial rotational movement.

3. The card reader system of claim 1 wherein an edge of the forward gate impacts an edge of the forward mounting plate when closed and wherein the edge of the forward gate is slightly offset from the edge of the forward mounting plate such that the forward gate, when open and allowing a card to pass by the forward gate, exerts a force on the card sufficient to force a card of insufficient rigidity out of the card path.

4. The card reader system of claim 1 and further comprising:

first and second side retainer arms disposed on opposite sides of the card path and operable to pivot in a plane defined by the card path about first and second axes disposed proximate the first and second gate skids;

the first and second side retainer arms each comprising forward bearing extensions extending forward from the forward gate and operable to bear on opposite edges of an appropriately sized card;

the first and second side retainer arms further comprising at least one side retainers coupled to each side retainer arm, the side retainers operable to bear against and hold in the card path an appropriately sized card only when such a card bears against the first and second forward bearing extensions;

the first and second side retainer arms biased to pivot about the axes such that the side retainers are disposed away from the card path when an appropriately sized card is not bearing on the forward bearing extensions.

5. The card reader of claim 4 and further comprising:

a rear carriage slidably connected to each of the rear ends of the retainer arms, the rear carriage operable to slide forward in a direction in the plane of the card path to impact the rear edge of an appropriately sized card inserted fully into the card reader system; and the rear carriage system comprising at least one rear retainer operable to impact the rear edge of the card and to hold the card in the card path and against the electric contact board.

6. The card reader system of claim I and further comprising a magnetic stripe reader disposed proximate the card path and coupled to the frame, the magnetic stripe reader operable to read data encoded on the card in a magnetic stripe.

7. The card reader system of claim 1 and further comprising a fraud prevention antennae coupled to the frame and disposed proximate the card path, the fraud prevention antennae operable to detect current in conductors connected to a card inserted in the card reader system.

8. The card reader system of claim 1 wherein the vending machine comprises a pay telephone.

9. A card reader system for use in a vending machine to receive cards as a method of payment, the card reader system comprising:

a frame including a front mounting plate and defining a card path and a card entry point;

first and second side retainer arms disposed on opposite sides of the card path and operable to pivot in a plane defined by the card path about first and second axes disposed on opposite sides of the card path;

the first and second side retainer arms each comprising forward bearing extensions extending forward from the axes and operable to bear on opposite edges of an appropriately sized card;

the first and second side retainer arms further comprising at least one side retainer coupled to each side retainer arm, the side retainers operable to bear against and hold in the card path an appropriately sized card only when such a card bears against the first and second forward bearing extensions;

the first and second side retainer arms biased to pivot about the axes such that the side retainers are disposed away from the card path when an appropriately sized card is not bearing on the forward bearing extensions; and an electric contact board disposed adjacent the card path proximate the side extensions, the electric contact board operable to electrically couple to electric contact points on a card having such contact points.

10. The card reader of claim 9 and further comprising:

a rear carriage slidably connected to each of the rear ends of the retainer arms, the rear carriage operable to slide forward in a direction in the plane of the card path to impact the rear edge of an appropriately sized card inserted fully into the card reader system; and the rear carriage system comprising at least one rear retainer operable to impact the rear edge of the card and to hold the card in the card path and against the electric contact board.

11. The card reader of claim 9 and further comprising:

a forward gate disposed in the card path and operable to slide out of the card path;

a spring coupled to the frame and to the forward gate and operable to bias the forward gate in a position blocking the card path;

first and second gate skids disposed at opposite ends of the forward gate at the edges of the card path, the first and second gate skids operable to impact an appropriately sized card simultaneously such that only a card that is sized to impact both the first and second gate skids simultaneously can proceed along the card path past the opened forward gate; and an electric contact board disposed adjacent the card path behind the forward gate, the electric contact board operable to electrically couple to electric contact points on a card having such contact points.

12. The card reader system of claim 11 wherein the frame comprises slots formed proximate opposite edges of the forward gate and wherein the forward gate is disposed in the slots such that the forward gate is allowed to move laterally in the slots when opened but is prevented from substantial rotational movement.

13. The card reader system of claim 11 wherein an edge of the forward gate impacts an edge of the forward mounting plate when closed and wherein the edge of the forward gate is slightly offset from the edge of the forward mounting plate such that the forward gate, when open and allowing a card to pass by the forward gate, exerts a force on the card sufficient to force a card of insufficient rigidity out of the card path.

14. The card reader system of claim 9 wherein the vending machine comprises a pay telephone.

15. A card reader system for use in a vending machine to receive cards as a method of payment, the card reader system comprising:

a frame including a front mounting plate and defining a card path and a card entry point;

a forward gate disposed in the card path and operable to slide out of the card path;

a spring coupled to the frame and to the forward gate and operable to bias the forward gate in a position blocking the card path;

first and second gate skids disposed at opposite ends of the forward gate at the edges of the card path, the first and second gate skids operable to impact an appropriately sized card simultaneously such that only a card that is sized to impact both the first and second gate skids simultaneously can proceed along the card path past the opened forward gate;

an electric contact board disposed adjacent the card path behind the forward gate, the electric contact board operable to electrically couple to electric contact points on a card having such contact points;

the frame comprising slots formed proximate opposite edges of the forward gate, the forward gate disposed in the slots such that the forward gate is allowed to move laterally in the slots when opened but is prevented from substantial rotational movement, an edge of the forward gate impacting an edge of the forward mounting plate when closed, the edge of the forward gate slightly offset from the edge of the forward mounting plate such that the forward gate, when open and allowing a card to pass by the forward gate, exerts a force on the card sufficient to force a card of insufficient rigidity out of the card path;

first and second side retainer arms disposed on opposite sides of the card path and operable to pivot in a plane defined by the card path about first and second axes disposed proximate the first and second gate skids;

the first and second side retainer arms each comprising forward bearing extensions extending forward from the forward gate and operable to bear on opposite edges of an appropriately sized card;

the first and second side retainer arms further comprising at least one side retainers coupled to each side retainer arm, the side retainers operable to bear against and hold in the card path an appropriately sized card only when such a card bears against the first and second forward bearing extensions;

the first and second side retainer arms biased to pivot about the axes such that the side retainers are disposed away from the card path when an appropriately sized card is not bearing on the forward bearing extensions;

a rear carriage slidably connected to each of the rear ends of the retainer arms, the rear carriage operable to slide forward in a direction in the plane of the card path to impact the rear edge of an appropriately sized card inserted fully into the card reader system; and the rear carriage system comprising at least one rear retainer operable to impact the rear edge of the card and to hold the card in the card path and against the electric contact board.

16. The card reader system of claim 15 and further comprising a magnetic stripe reader disposed proximate the card path and coupled to the frame, the magnetic stripe reader operable to read data encoded on the card in a magnetic stripe.

17. The card reader system of claim 15 and further comprising a fraud prevention antennae coupled to the frame and disposed proximate the card path, the fraud prevention antennae operable to detect current in conductors connected to a card inserted in the card reader system.

18. The card reader system of claim 15 wherein the vending machine comprises a pay telephone.

* * * * *